United States Patent
Kaushal et al.

(10) Patent No.: US 10,432,631 B2
(45) Date of Patent: Oct. 1, 2019

(54) SYSTEM AND METHOD FOR PROVIDING A UNIVERSAL SECURITY HANDLER FOR A CLOUD-BASED INTEGRATION PLATFORM

(71) Applicant: Oracle International Corporation, Redwood Shores, CA (US)

(72) Inventors: Anuj Kaushal, Uttar Pradesh (IN); Yagnesh Kotecha, Maharashtra (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 172 days.

(21) Appl. No.: 15/341,599

(22) Filed: Nov. 2, 2016

(65) Prior Publication Data
US 2017/0264612 A1    Sep. 14, 2017

(51) Int. Cl.
*H04L 29/06* (2006.01)
*H04L 29/08* (2006.01)

(52) U.S. Cl.
CPC ......... *H04L 63/10* (2013.01); *H04L 63/0807* (2013.01); *H04L 63/168* (2013.01); *H04L 63/205* (2013.01); *H04L 67/02* (2013.01); *H04L 67/10* (2013.01)

(58) Field of Classification Search
CPC ....... H04L 63/10; H04L 63/168; H04L 67/10; H04L 63/205; H04L 63/0807; H04L 67/02
USPC .......................................................... 726/1
See application file for complete search history.

(56) References Cited

U.S. PATENT DOCUMENTS

| | | | | |
|---|---|---|---|---|
| 2013/0097006 | A1* | 4/2013 | Evans | G06Q 20/20 705/14.39 |
| 2014/0278623 | A1* | 9/2014 | Martinez | G06Q 10/06 705/7.12 |
| 2016/0134616 | A1* | 5/2016 | Koushik | H04L 63/0807 726/9 |
| 2017/0118037 | A1* | 4/2017 | Kitchen | H04L 12/2818 |
| 2017/0118095 | A1* | 4/2017 | Konecny | H04L 41/5054 |

OTHER PUBLICATIONS

Dick Hardt et al., "The OAuth 2.0 Authorization Framework" RFC 6749, Copyright © 2012, Oct. 2012, Internet Engineering Task Force (IETF), 69 pages, retrieved Jun. 28, 2017 from: <http://www.rfc-base.org/txt/rfc-6749.txt>.

* cited by examiner

*Primary Examiner* — Mohammed Waliullah
(74) *Attorney, Agent, or Firm* — Tucker Ellis LLP

(57) ABSTRACT

In accordance with an embodiment, described herein is a system and method for providing a universal security handler for use with a cloud-based integration platform. A universal security configuration interface can be provided to capture custom values, syntaxes, and/or grammars for a common set of security properties for different implementations of a particular authorization flow. The captured information can be used by a plurality of software components to create a custom security provider, which includes information needed for obtaining an access token from a specified cloud service provider. The security provider, which also includes methods for performing each step of the authorization flow, can be provided to a security processor configured to handle exchanges between the universal security configuration interface and the specified cloud service provider. The system enables the cloud-based integration platform to integrate with a plurality of third-party cloud services without writing additional code.

20 Claims, 7 Drawing Sheets

FIGURE 4

SYSTEM AND METHOD FOR PROVIDING A UNIVERSAL SECURITY HANDLER FOR A CLOUD-BASED INTEGRATION PLATFORM

COPYRIGHT NOTICE

A portion of the disclosure of this patent document contains material which is subjected to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to Indian Provisional Application titled "SYSTEM AND METHOD FOR PROVIDING A GENERIC SECURITY HANDLER FOR CLOUD BASED INTEGRATION WITH PROTECTED RESOURCES", Application No. 201641008552, filed Mar. 11, 2016, which is herein incorporated by reference.

FIELD OF INVENTION

Embodiments of the invention are generally related to cloud service, and are particularly related to a system and method for providing a universal security handler for use with a cloud-based integration platform.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) can provide a set of cloud-based tools to address these challenges. An iPaaS platform can provide a design time for users to design integration flows, which can integrate resources protected using different security protocols. Many of these security protocols, for example, OAuth 2.0, are open authorization frameworks. Each open authorization framework may define a plurality of steps in a particular authorization flow without specifying how each step should be implemented. As such, a cloud-based integration platform typically needs to provide custom code to access a given protected resource.

SUMMARY

In accordance with an embodiment, described herein is a system and method for providing a universal security handler for use with a cloud-based integration platform. A universal security configuration interface can be provided to capture custom values, syntaxes, and/or grammars for a common set of security properties for different implementations of a particular authorization flow. The captured information can be used by a plurality of software components to create a custom security provider, which includes information needed for obtaining an access token from a specified cloud service provider. The security provider, which also includes methods for performing each step of the authorization flow, can be provided to a security processor configured to handle exchanges between the universal security configuration interface and the specified cloud service provider. The system enables the cloud-based integration platform to integrate with a plurality of third-party cloud services without writing additional code.

BRIEF DESCRIPTION OF THE FIGURES

FIG. 4 illustrates an example of a universal security configuration interface, in accordance with an embodiment.

DETAILED DESCRIPTION

The enclosed specification and drawings use an integration cloud service (ICS) and OAuth 2.0 security protocol to illustrate various embodiments of the invention. However, it will be apparent that various embodiments described herein may be practiced with other cloud-based integration platforms, and other security protocols. Specific details set forth in the specification are intended to provide an understanding of the various embodiments, and are not required to practice the various embodiments.

Figure 1:
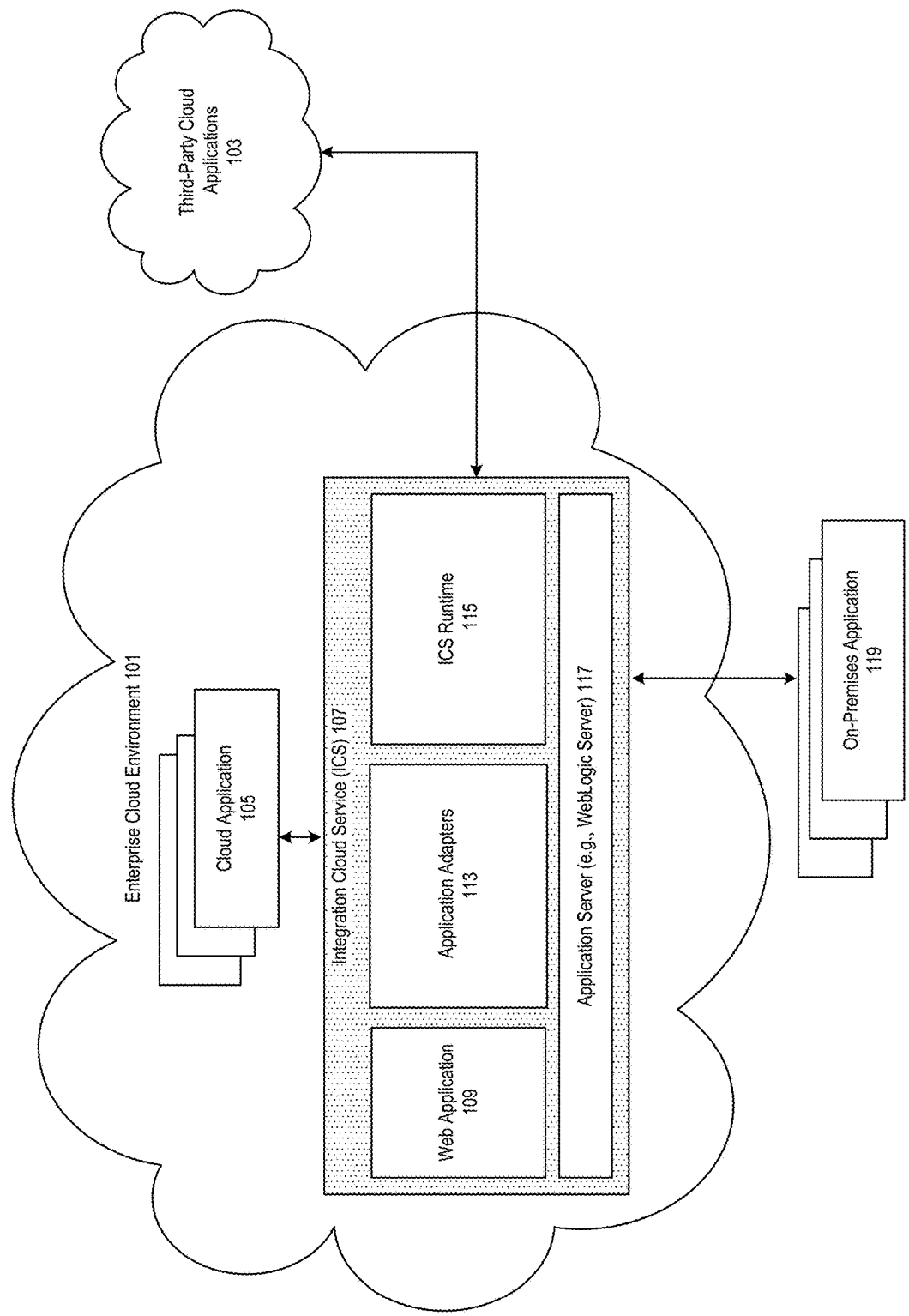
FIG. 1 illustrates an example integration cloud service, in accordance with an embodiment.

FIG. 1 illustrates an example integration cloud service, in accordance with an embodiment.

As shown in FIG. 1, an integration cloud service 107 can provide a cloud-based platform for building and deploying integration flows for use in connecting applications residing in the cloud or on-premises, for example, enterprise cloud applications 105, third-party cloud applications 103, and on-premises applications 119. Each third-party cloud application can be a cloud service provided by a cloud service provider. For example, Facebook can be a cloud service provided by the cloud service provider Facebook™.

In accordance with an embodiment, the integration cloud service can include a web application 109, an ICS runtime 115, and a plurality of application adapters 113 executing on an application server 117 in an enterprise cloud environment (for example, Oracle Public Cloud) 101.

In accordance with an embodiment, the web application can expose a plurality of user interfaces for an ICS developer to design, activate, manage, and monitor an ICS integration flow, so that the ICS integration flow can be deployed and executed in the ICS runtime. An ICS integration flow (or ICS integration) can include a source connection, a target connection, and field mappings between the two connections. Each connection identify a unique application endpoint that is accessed using the ICS, and can include information required to communicate with a specific instance of an application.

For example, the source connection can include information required to connect to a source application, and can be used by the ICS to receive requests from the source application (for example, an Oracle RightNow cloud application). The target connection can include information required to connect to a target application (for example, a Salesforce cloud application), and can be used by the ICS to send requests to the target application.

In accordance with an embodiment, each of the plurality of applications can be a cloud service provided by particular cloud service provider.

In accordance with an embodiment, each connection can be based on one of the plurality of application adapters, and can include additional information required by the application adapter to communicate with a specific instance of an application corresponding to that application adapter.

For example, the additional information can include types of operations to be performed on data associated with a request, and objects and fields against those operations.

As such, the plurality of application adapters can simplify the task of configuring connections for a plurality of applications, by handling the underlying complexities of connecting to those applications.

In accordance with an embodiment, each application adapter can include a security processor for configuring security of a connection based on the application adapter. The security processor can include a custom logic for implementing each step required for configuring the security of a connection to access a particular protected resource.

For example, for a connection configured to access a resource protected under OAuth 2.0, the corresponding security processor can include a custom logic with values for security properties for a particular authorization server, and detailed information for implementing a two-legged or three-legged authorization flows using the values for the security properties. The custom logic can be triggered at runtime to obtain an access token for use in accessing the protected resource.

OAuth 2.0 Security Protocol

OAuth 2.0 is an open authorization protocol that enables an enterprise application to obtain limited access to a user's account on a cloud service (for example, a user's account on Facebook™), so as to access protected resources (for example, the user's profile on Facebook™) hosted by the cloud service. OAuth 2.0 delegates user authentication to the cloud service that hosts the user account, and authorizes the third-party enterprise application to access the user account.

In accordance with an embodiment, OAuth 2.0 allows an access token to be issued by an authorization server associated with the cloud service to the enterprise application with the approval of the resource owner. The enterprise application can subsequently use the access token to access the protected resources hosted by a resource server associated with the cloud service.

In an accordance with an embodiment, OAuth 2.0 defines a plurality of grant types (for example, authorization code, implicit, resource owner password credentials, and client credentials) and an extensibility mechanism for defining additional grant types.

However, the implementation details of each grant type are not defined, and instead, are left to each cloud service provider. As such, different cloud service providers may have interpreted the specification differently, and implemented a same grant type differently.

For example, for the grant type of authorization code, OAuth 2.0 specifies a three-legged authorization flow where an enterprise application, or another client application, can obtain an authorization code from a cloud service provider, and subsequently exchange the authorization code for an access token. OAuth 2.0 also specifies that the cloud service provider can allow the enterprise application to refresh the access token. In practice, each cloud service provider may have its own set of security properties and mechanism for passing the security properties between an enterprise application and the cloud service provider during the three-legged authorization flow.

As an illustrative example, a cloud service provider, for example, Google™, may use additional properties during the authorization flow, such as "approval_prompt" and "access_type".

As another illustrative example, according to the specification of OAuth 2.0, an access token can be passed as an authorization header, or as a query parameter, in an HTTP request for a protected resource on a cloud service.

As such, as described above, the custom logic in the security processor of each application adapter is specific to a particular cloud service provider.

For the ICS to integrate a protected resource on a new cloud service, a custom logic specific to the new cloud service needs to be provided to handle the security for connecting to the protected resource.

Definitions of Terms

The following terms are used throughout this document. It will be evident that, in accordance with other embodiments, additional and/or different terms can be used.

Authorization Request: In accordance with an embodiment, an authorization request is a URI (endpoint) on an authorization server where a resource owner logs in, and grants authorization to a client application. It can be used to obtain an authorization code.

Access Token Request: In accordance with an embodiment, an access token request is an endpoint on an authorization server where a client application exchanges an authorization code for an access token.

Fetch Rules: In accordance with an embodiment, fetch rules are regular expressions specified to allow a client application to retrieve an authorization code, an access token, a refresh token, an expiry, a token type, and one or more other parameters during interactions with an authorization server.

Access Token Usage: In accordance with an embodiment, an access token usage can represent a syntax illustrating how an access token should be passed to an authorization server to access a protected resource, for example, either as a header or as a query parameter in an HTTP request.

Authorization Context: In accordance with an embodiment, an authorization context can be an object or a structure that holds all the authorization properties. The authorization context is user interface and persistence agnostic, and is used throughout the design time and runtime authorization flow.

Authorization Context Manager: In accordance with an embodiment, an authorization context manager can be used to persist and re-hydrate an authorization context to a persistence store which is transparent to a user.

Security Provider: In accordance with an embodiment, a security provider is an entity that holds all the relevant security configuration for a specific authorization server. The security information contained in a security provider can include a grant type and its associated access token request, refresh token request, access token usage, and how to retrieve access tokens and refresh tokens from a request thereof.

Security Processor: In accordance with an embodiment, a security processor handles security using a configured security provider and grant type, all exchanges, caching, expiry and token management. The security processor can return an access token to a client application. It is transparent to the client application whether the access token returned is obtained fresh, or from a cache or a secure credential store.

Delegator Servlet: In accordance with an embodiment, a delegator servlet is an entry point into an authorization flow from a user interface.

Callback Servlet: In accordance with an embodiment, a callback servlet can resume a three-legged authorization flow.

Universal Security Handler

In accordance with an embodiment, the system and method described herein can provide a universal security handler for use by a cloud-based integration platform. A universal security configuration interface can be provided to capture custom values, syntaxes, and/or grammars for a common set of security properties for different implementations of a particular authorization flow. The captured information can be used by a plurality of software components to create a custom security provider, which includes information needed for obtaining an access token from a specified cloud service provider.

The security provider, which also includes methods for performing each step of the authorization flow, can be provided to a security processor configured to handle exchanges between the universal security configuration interface and the specified cloud service provider. The system enables the cloud-based integration platform to integrate with a plurality of third-party cloud services without writing additional code.

At runtime, when configuring a connection as part of an integration flow to access one or more protected resources on a cloud service, a user can provide custom values, grammars, and/or syntaxes for a set of security properties on the universal security configuration interface. The system can perform each step of an authorization flow for retrieving an access token, and can provide the access token to the user.

Figure 2:
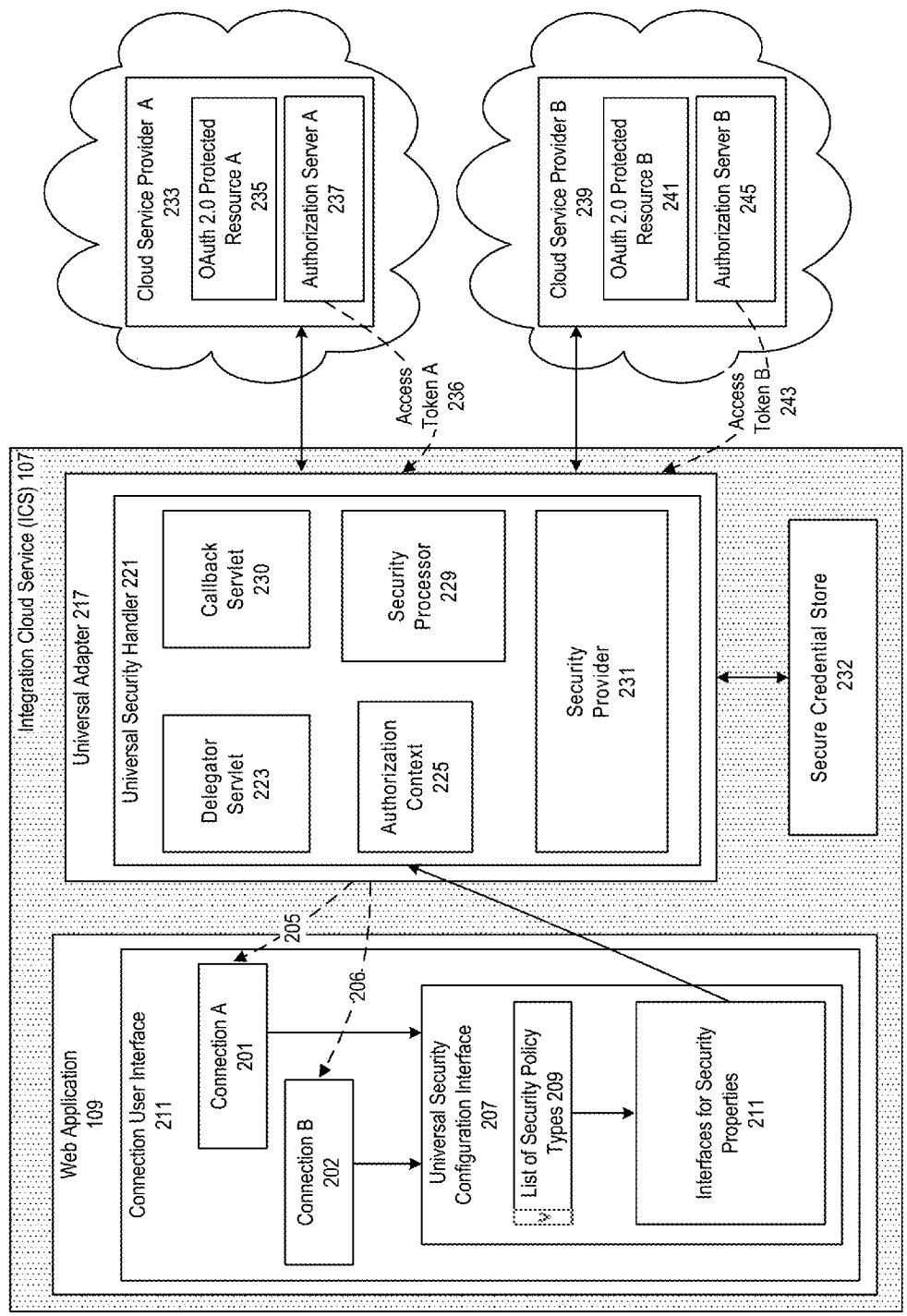
FIG. 2 illustrates a system for providing a universal security handler for use in a cloud-based integration platform, in accordance with an embodiment.

FIG. 2 illustrates a system for providing a universal security handler for use in a cloud-based integration platform, in accordance with an embodiment.

As shown in FIG. 2, the web application 109 in the integration cloud service 107 can include a connection user interface 211 for configuration connections (for example, connection A 201 and connection B 202) to a plurality of cloud service providers (for example, cloud service provider A 233, and cloud service provider B 239).

In accordance with an embodiment, each connection can be configured as part of a client application (for example, an ICS project) to access an OAuth 2.0 protected resource provided by a different cloud service provider, for example, OAuth 2.0 protected resource A 235 or OAuth 2.0 protected resource B 241.

In accordance with an embodiment, a universal security configuration interface 207 can be provided for capturing values, syntaxes and/or grammars for security properties used for configuring each connection. The universal security configuration interface can include a dropdown list 209 for an ICS user to select a security policy used for accessing the resource that the connection is configured.

For example, the list of security policies can include a plurality of authorization flows for a plurality of grant types defined by the OAuth 2.0 specification, and for one or more additional grant types defined by the extensibility mechanism specified by the OAuth 2.0 specification.

Based on the grant type used by a cloud service provider that provides the protected resource, an ICS user can select a corresponding security policy. In response to the selection, the web application can display a plurality of interfaces 211 for security properties corresponding to the selected security policy.

In accordance with an embodiment, the system further can include a universal adapter 217 and a universal security handler 221 therein. The universal security handler can be invoked by the universal security interface to obtain an access token (for example, access token A 236 and access token B 243) from an authorization server (for example, authorization server A 237 or authorization server B 245) associated with a cloud service provider.

In an accordance with an embodiment, the universal security interface can send the information provided and captured at the universal security configuration interface in an HTTP request to the universal security handler.

In accordance with an embodiment, the captured information can be sent as a JavaScript Object Notation (JSON) body to a delegator servlet 223 in the universal security handler. The delegate servlet can use the captured information to create an authorization context 225, and provide the authorization context to a security manager that uses the authorization context to create a security provider 231.

The security provider can include detailed information pertaining to each step in an authorization flow defined by a particular cloud service provider, for example, an authorization request, an access token request, a refresh token request, and a plurality of fetch rules for retrieving an authorization code, an access token, and a refresh token.

The security provider can also include a plurality of methods for using the captured information to perform each step of an authorization flow specified at the universal security configuration interface.

In accordance with an embodiment, the delegator servlet can further create a security processor 229, which can invoke the security provider to perform each step in the authorization flow.

For example, when the delegator servlet directs the security processor to initiate an authorization flow, the security processor can invoke the security provider, which can use an appropriate authorization request to initiate the authorization flow for a given protected resource.

In accordance with an embodiment, a callback servlet 230 can get a callback request from an authorization server with an authorization code, after a user authenticates and provides consent for the client application to access a protected resource. The callback servlet can invoke the security processor to obtain the authorization code from the callback request. The security processor can in turn invoke the security provider to retrieve the authorization code from the callback request.

Similarly, in accordance with an embodiment, when the delegator servlet invokes the security processor to obtain an access token, the security processor can invoke the security provider, which can obtain the access token from an authorization server for the given authorization code.

In accordance with an embodiment, the obtained access token can be persisted along with the rest of the security configuration in a secure credential store 231, and can be provided 205 and 206 to a corresponding connection.

In accordance with an embodiment, at runtime, an access token and configuration information for a particular connection can be passed in an HTTP request to access a protected resource. If the access token is invalidated, the security processor can invoke the security provider to refresh the invalidated access token.

Figure 3:
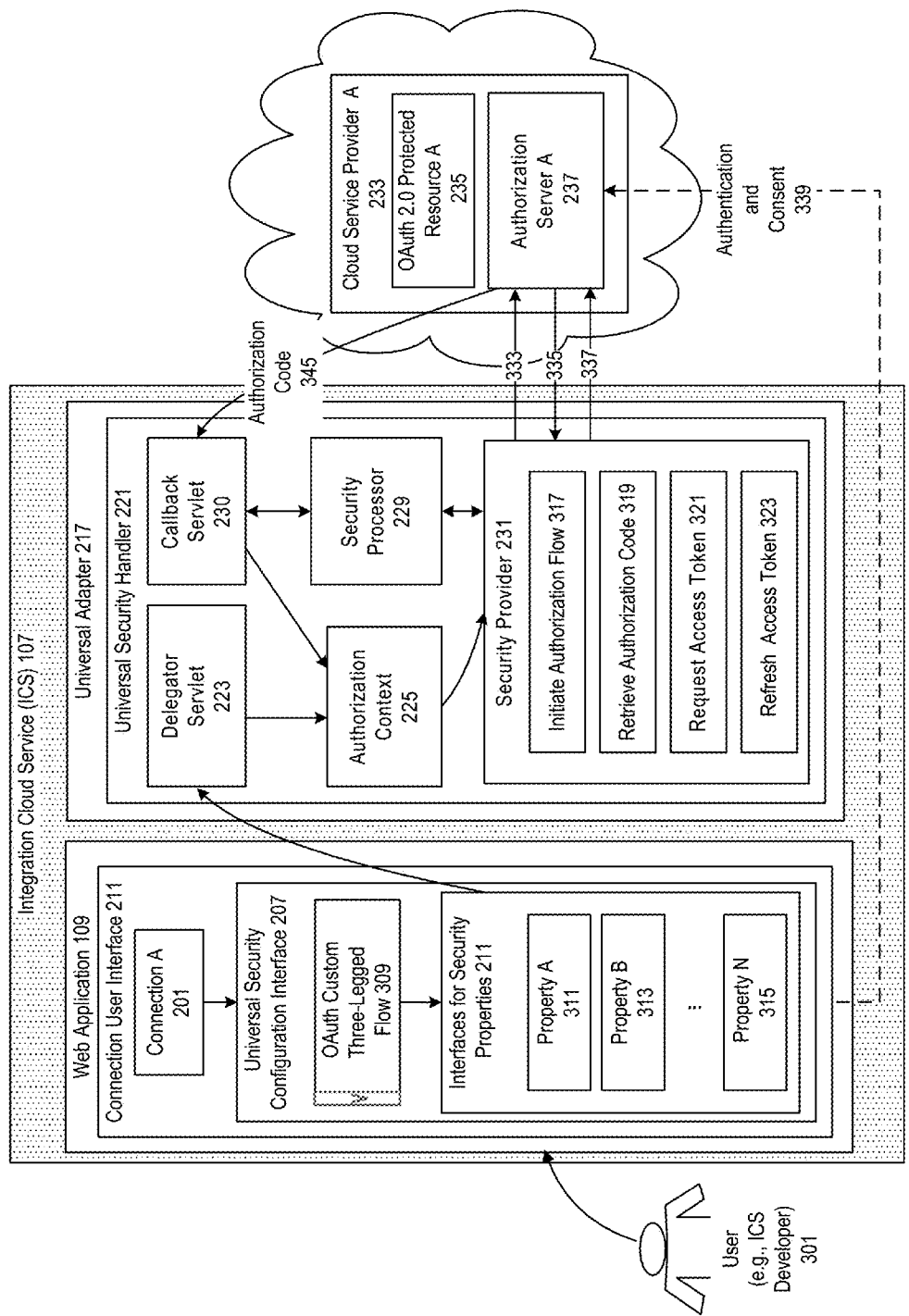
FIG. 3 further illustrates a system for providing a universal security handler for use in a cloud-based integration platform, in accordance with an embodiment.

FIG. 3 further illustrates a system for providing a universal security handler for use in a cloud-based integration platform, in accordance with an embodiment.

More particularly, FIG. 3 illustrates a system where a user 301 has selected a three-legged authorization flow 309 for configuring connection A, since cloud service provider A implements a three-legged authorization flow for OAuth 2.0 protected resource A.

In accordance with an embodiment, the type of security policy used by a cloud service, and custom values, syntaxes, and/or grammars for a plurality of security properties required for accessing the protected resource on the cloud service can be obtained by the user from an authorization server associated with the cloud service.

As shown in FIG. 3, in response to the user selecting the three-legged authorization flow, the universal security configuration interface can display a plurality of interfaces (for example, input fields) 211 for the plurality of security properties required for accessing OAuth 2.0 protected resource A.

For example, the plurality of interfaces can include an interface for property A 311, property B 313, and property N 315. Each of the plurality of interfaces can be used for the user to enter a value for a particular security property for accessing the protected resources on cloud service A.

In accordance with an embodiment, Property A can represent an authorization request, property B can represent an access token request, and property N can represent an access token usage. A plurality of interfaces for the user to enter fetch rules can also be provided.

As further shown in FIG. 3, the captured information for the plurality of security properties can be sent in an HTTP request to the universal security handler, and can be used to create the authorization context.

In accordance with an embodiment, the authorization context can include the captured information for each of the security properties displayed on the universal security configuration interface.

At runtime, the captured information can be used by the security provider to perform each step in a three-legged authorization flow.

In accordance with an embodiment, the security provider can include a plurality of methods that can be used during the authorization flow.

For example, an authorization flow initiation method 317 can be invoked to start 333 the first leg of the three-legged authorization flow. The universal security handler can connect to authorization server A using the authorization server URI in the security provider, and the user can be prompted 335 to prove identity by logging in to authorization server A.

In accordance with an embodiment, after the user authenticates and provides consent 339 for the client application to access the protected resource, the callback servlet can get a callback request 345 from the authorization server with an authorization code.

In accordance with an embodiment, an authorization code retrieval method 319 can be invoked to retrieve the authorization code from the callback request (a response from the authorization server) using a fetch rule from the security provider.

Using the authorization code, an access token request method 321 can be invoked to retrieve 337 an access token from authorization server A using information (e.g., the value for access token request) in the security provider.

Since the authorization code may not be known all the time in the security configuration process, an interim token can be used to represent the authorization code in the authorization flow when the authorization code is not known. After the authorization code is retrieved from the authorization server, the interim token can be replaced by the authorization code.

In accordance with an embodiment, the interim token can be represented by a variable, for example, ${auth_code}. A fetch rule (for example, a regular expression) can be specified in the universal security configuration interface to retrieve the authorization code. The fetch rule can be specified based on string patterns of a callback request returned from the authorization server.

Similarly, since an access token and a token type may not known all the time in the security configuration process, they can be represented by variables ${access_token} and ${token_type} respectively before the values for the variables are returned from the authorization server. Fetch rules can be specified in the universal security configuration interface to retrieve the values for the variables.

In accordance with an embodiment, if the access token is found invalid, an access token refresh method 323 can be invoked to refresh the invalidated access token.

Figure 4:
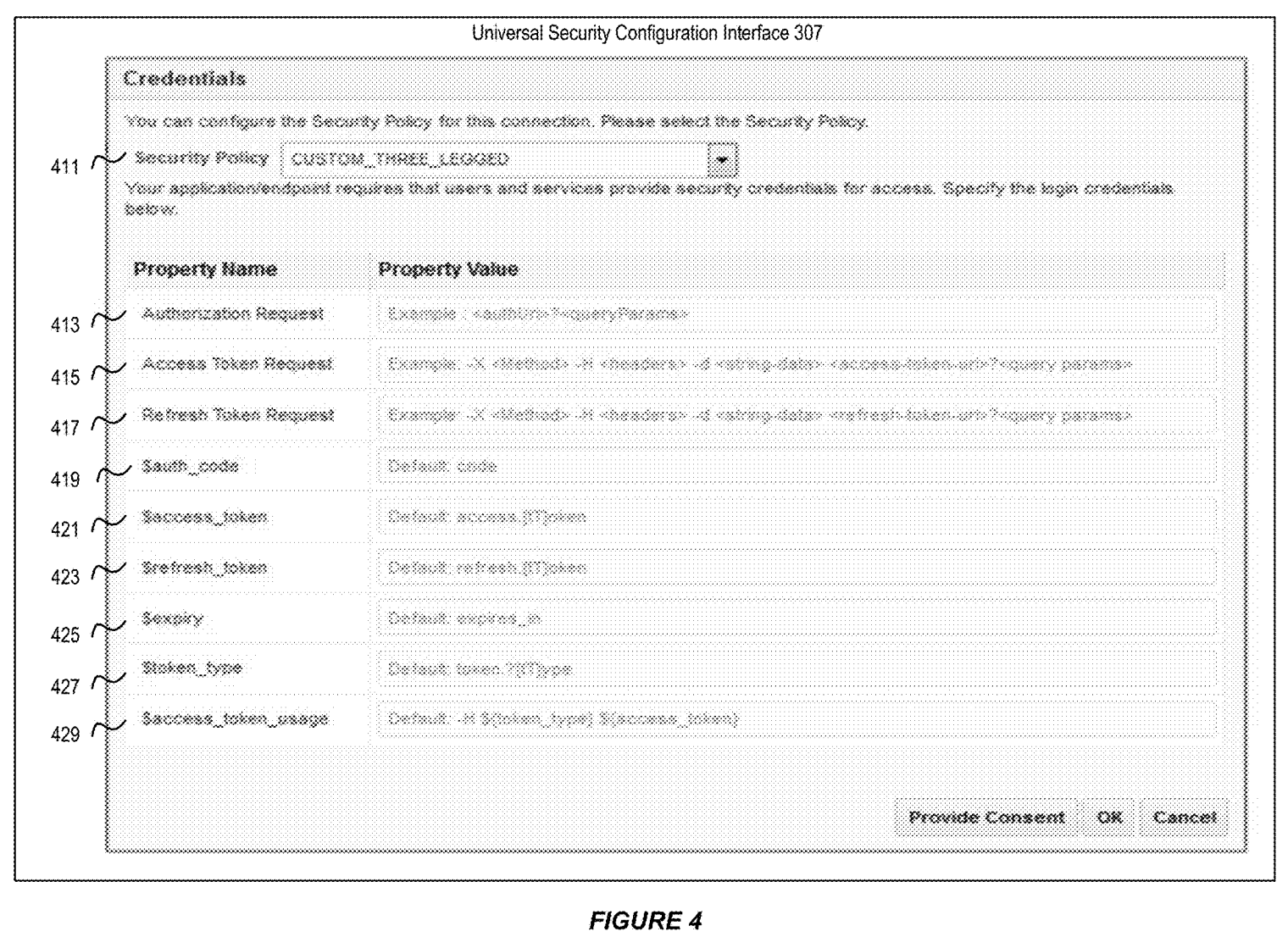

FIG. 4 illustrates an example of a universal security configuration interface, in accordance with an embodiment.

As shown in FIG. 4, a dropdown list 411 allows a user to select a security policy for use in configuring security for a connection created to access a protected resource on a cloud service that implements the security policy.

In this particular example, a three-legged authorization flow has been selected. The selection of the three-legged authorization flow can cause the system to display a plurality of input fields for the user to provide values for a plurality of security properties 413 through 429.

The security properties 419 through 427 are fetch rules represented by regular expressions to retrieve values returned from an authorization server. The retrieved values can subsequently be substituted for a plurality of variables whose values are not always known in the three-legged authorization flow. For example, the plurality of variables can be ${auth_code}, ${access_token}, ${refresh_token}, ${expiry}, and ${token_type}.

In accordance with an embodiment, if a two-legged authorization is selected, a different set of security properties can be displayed, together with input fields for the user to provide custom information for each of the set of security properties.

As described above, the universal security handler can process the provided custom information, and use the custom information to obtain an access token.

As such, by providing the universal security configuration interface, and the universal security handler, the system can provide an extensibility framework for use by an ICS user to integrate a client application with multiple cloud service providers, which may have implemented their own variations of OAuth 2.0 security protocol.

Figure 5A:
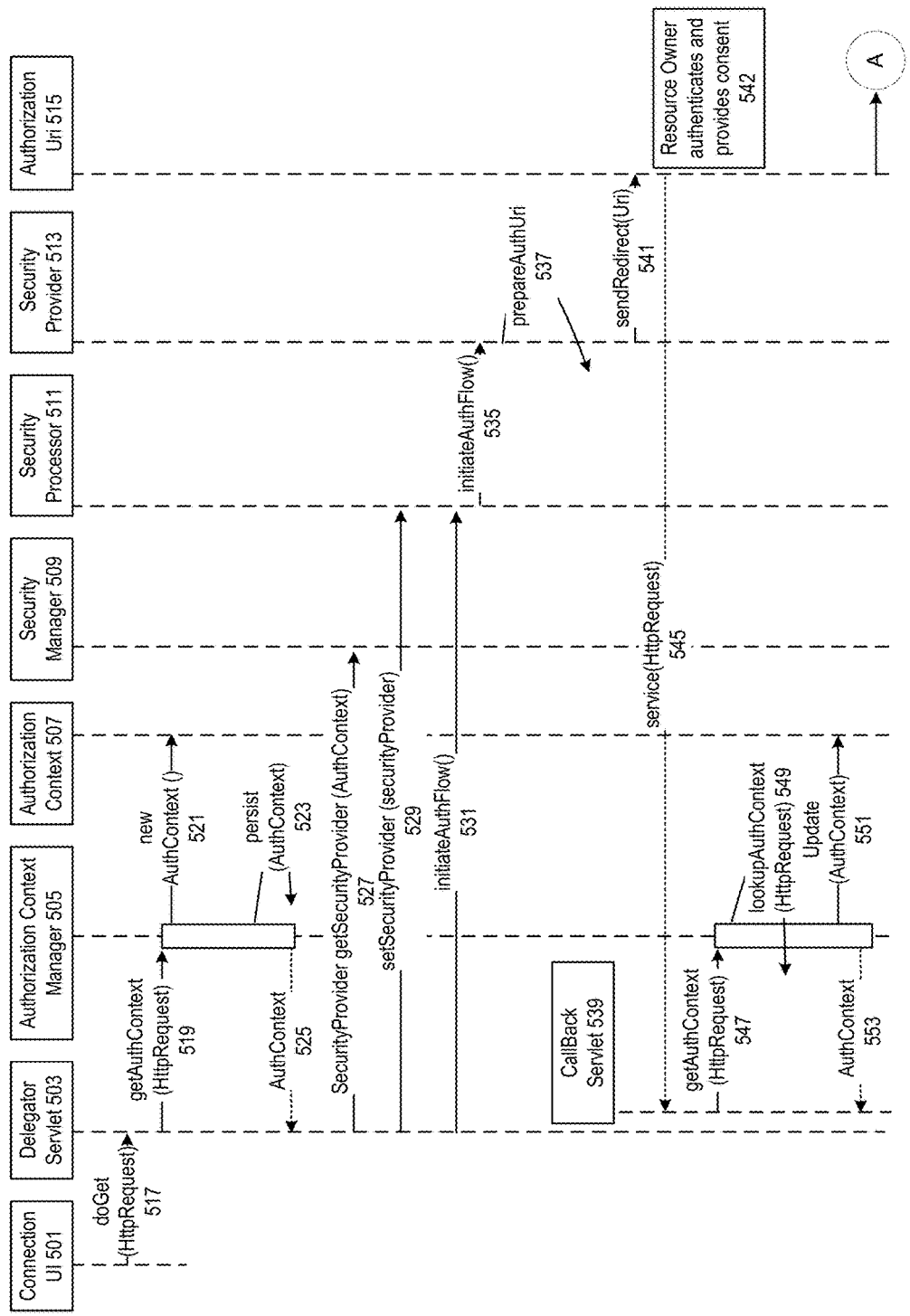
FIGS. 5A-5B illustrate a sequence for obtaining an access token by a universal security hander from an authorization server, in accordance with an embodiment.
Figure 5B:
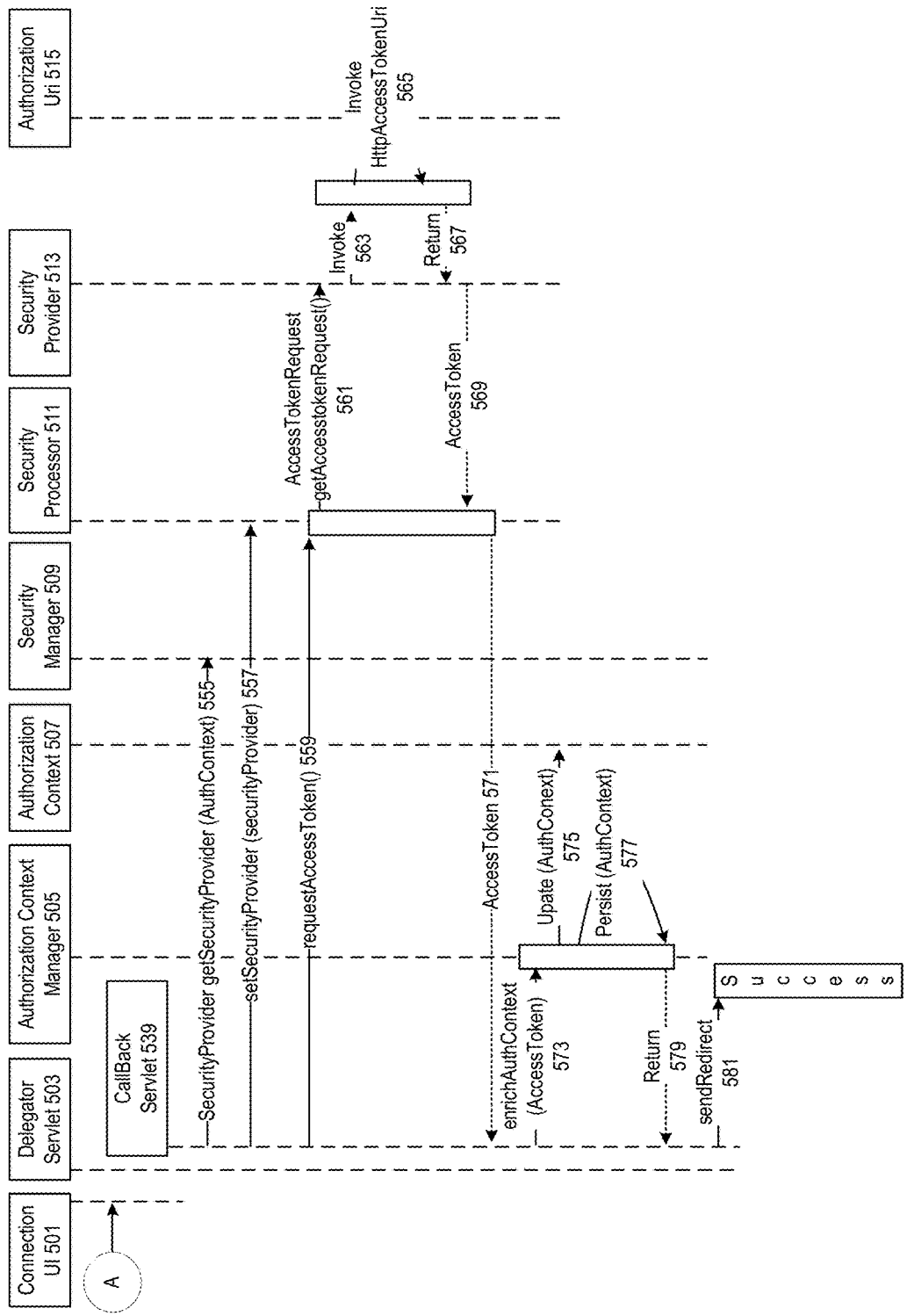

FIGS. 5A-5B illustrate a sequence of obtaining an access token by a universal security hander from an authorization server, in accordance with an embodiment.

As shown in FIG. 5A, a connection UI 501 can be displayed for a user to design an integration flow (a client application) using a web application provided in a cloud-based integration platform.

In accordance with an embodiment, the connection UI can send an HTTP request 517 to a delegator servlet 503 to initiate an authorization flow. Custom information entered by a user for security properties can be passed as a JSON body in the HTTP request.

In accordance with an embodiment, the delegator servlet can invoke 519 an authorization context manager 505 to create 521 a serializable authorization context 507.

In accordance with an embodiment, the authorization context manager can persist 523 the newly created authorization context, and also provide 525 the authorization context to the delegator servlet.

In accordance with an embodiment, the delegator servlet can invoke a security manager 509 using the authorization context to create 527 a security provider 513. The security provider can be an entity that includes information that can be used to request an authorization code, obtain an access token, and refresh an access token.

In accordance with an embodiment, the security provider can be provided 529 to a security processor 511, which can be subsequently invoked by the delegator servlet to initiate 531 an authorization flow.

In accordance with an embodiment, in response to the invocation of the delegator servlet, the security processor can initiate 535 the authorization flow by calling the security provider, which can prepare 537 an authorization URI by retrieving an authorization URI from the authorization context, and attaching a plurality of query parameters and a callback URI.

In accordance with an embodiment, as part of the authorization flow initiation, the security provider can redirect 541 the client application to the authorization URI 515 where a resource owner can authenticate and provide consent 542, and can subsequently be directed back 545 by the authorization server to a callback servlet 539.

In accordance with an embodiment, as part of the redirection, the authorization server can return an authorization code along a correlation id to the callback servlet. The callback servlet can invoke 547 the authorization context manager to update the authorization context with the authorization code.

As shown in FIG. 5A, the authorization context manager can locate 549 the authorization context using the correlation id, update 551 the authorization context, and return 553 the updated authorization context to the callback servlet.

Referring to FIG. 5B, the callback servlet can call 555 the security manager with the updated authorization context. The security manager can create a new security provider that includes the information from the updated authorization context, and can provide the security provider to the callback servlet.

After receiving the security provider, the callback servlet can provide 557 the security provider to the security processor, and can invoke 559 the security processor to request an access token.

As shown in FIG. 5B, the security processor can invoke 561 the security provider for obtaining an access token. The security provider can invoke 563 an access token request URI (i.e. HttpAccessTokenUri) 565 to obtain 567 an access token from the authorization server for the given authorization code in the security provider.

In accordance with an embodiment, the access token can be passed 569 by the security provider to the security processor, which can pass 571 the access token further to the callback servlet.

As further shown in FIG. 5B, the callback servlet can update 573 the authorization context with the access token by invoking the authorization context manager, which can update 575 the authorization context with the access token, persist 577 the updated authorization context, and return 579 the execution of the authorization flow to the callback servlet, which can redirect 581 the user to the connection UI.

Figure 6:
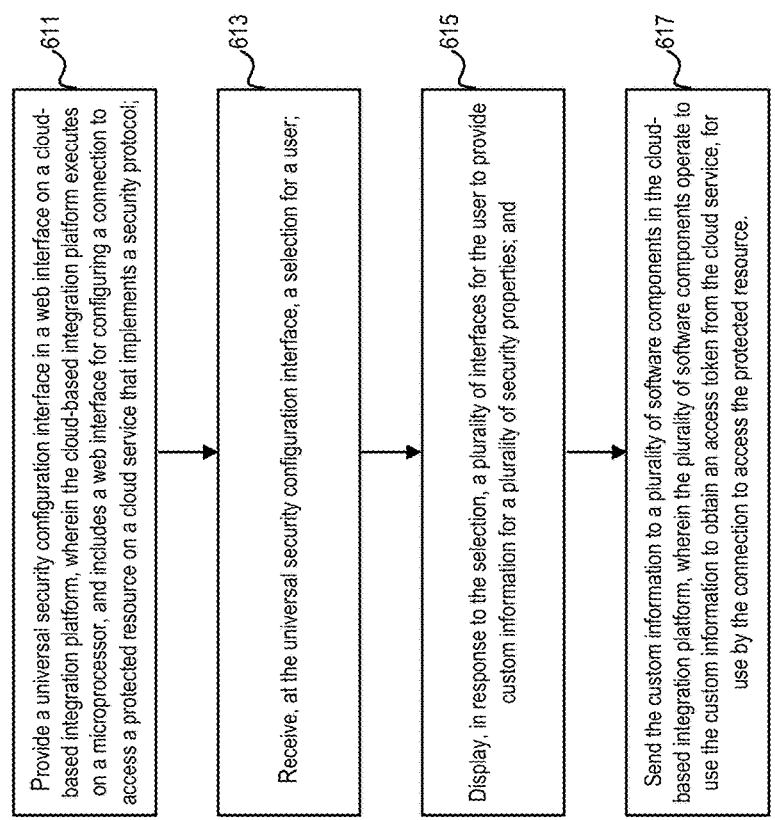
FIG. 6 illustrates a method for providing a universal security handler for use in a cloud-based integration platform, in accordance with an embodiment.

FIG. 6 illustrates a method for providing a universal security handler for use in a cloud-based integration platform, in accordance with an embodiment.

As shown in FIG. 6, at step 611, a universal security configuration interface is provided in a web interface on a cloud-based integration platform, wherein the cloud-based integration platform executes on a microprocessor, and includes a web interface for configuring a connection to access a protected resource on a cloud service that implements a security protocol.

At step 613, a selection from a user is received at the universal security configuration interface.

At step 615, in response to the selection, a plurality of interfaces are displayed in the universal security configuration interface for the user to provide custom information for a plurality of security properties.

At step 617, the custom information is sent to a plurality of software components in the cloud-based integration platform, wherein the plurality of software components operate to use the custom information to obtain an access token from the cloud service, for use by the connection to access the protected resource.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for configuring connections in a cloud-based integration platform, the system comprising:
    a microprocessor;
    a memory device;
    a cloud-based integration platform executing on the microprocessor, wherein the cloud-based integration platform comprises a web interface operating to configure connections used to access protected resources on cloud services that implement security protocols for permitting access to the protected resources;

a universal security configuration interface in the web interface, wherein the universal security configuration interface is configured to:
  receive a resource selection from an associated user of the system for access to a protected resource on a specified cloud service;
  in response to the resource selection, display a plurality of interfaces prompting the associated user to provide custom credential information for satisfying a plurality of security properties of a security protocol of the specified cloud service comprising custom values, syntaxes, and/or grammars for a set of security properties for an authorization flow particular to the specified cloud service for permitting the access to the protected resource using an access token in a step of a plurality of ordered steps of the authorization flow particular to the specified cloud service; and
  receive the custom credential information for satisfying the plurality of security properties of the security protocol of the specified cloud service to permit the access to the protected resource using the access token in the step of the plurality of ordered steps of the authorization flow of the security protocol particular to the specified cloud service; and
  store the received custom credential information in the memory device; and
a plurality of software components in the cloud-based integration platform, wherein the plurality of software components operate to:
  receive a request from an application associated with the connection for access to a selected protected resource on the specified cloud service;
  retrieve the custom credential information from the universal security configuration interface;
  use the custom credential information retrieved from the universal security configuration interface to obtain the access token from the cloud service, for use by the application to access the selected protected resource in accordance with the authorization flow particular to the specified cloud service; and
  provide the token and the custom credential information to the application for access by the application to the selected protected resource using the access token in the step of the authorization flow of the security protocol particular to the specified cloud service.

2. The system of claim 1, wherein:
the cloud-based integration platform comprises an integration cloud service; and
the security protocol is OAuth 2.0.

3. The system of claim 1, wherein the plurality of software components in the cloud-based integration platform comprise:
a universal security handler configured to receive the custom credential information and create an authorization context comprising an object or a structure that holds the custom credential information;
a security manager configured to create a security provider using the authorization context, wherein the security provider comprises information and methods for performing each step of the authorization flow particular to the specified cloud service; and
a security processor comprising logic for implementing each step of the authorization flow, wherein the security processor is responsive to receiving the request from the application associated with the connection to use the security provider to obtain the access token and use the access token in the step of the plurality of steps of the authorization flow of the security protocol particular to the specified cloud service to access the protected resource.

4. The system of claim 1, wherein the universal security configuration interface comprises a dropdown list comprising a plurality of security policies, each security policy corresponding to a step in the authorization flow defined by the security protocol.

5. The system of claim 4, wherein a selection of a particular security policy from the dropdown list causes the system to display the plurality of interfaces for the user to provide the custom credential information for a plurality of security properties.

6. The system of claim 1, wherein:
the custom credential information is provided on an authorization server associated with the cloud service; and
the plurality of software components use the custom credential information retrieved from the universal security configuration interface to obtain an access token passed as an authorization header of a query for the protected resource or used as a parameter of the query for the protected resource.

7. The system of claim 1, wherein the plurality of software components comprises an authorization context that comprises the custom credential information, and a security provider that comprises information and methods for performing each step of the plurality of steps of the authorization flow in obtaining the access token.

8. The system of claim 7, wherein the authorization flow comprises a two-legged authorization flow defined by OAuth 2.0 or a three-legged authorization flow defined by OAuth 2.0.

9. The system of claim 1, wherein the custom credential information is sent to the plurality of software components as a JavaScript Object Notation (JSON) body in an HTTP request.

10. A method for configuring connections in a cloud-based integration platform, the method comprising:
providing a universal security configuration interface in a web interface on a cloud-based integration platform, wherein the cloud-based integration platform executes on a microprocessor and a memory device, and includes a web interface for configuring connections used to access protected resources on cloud services that implement security protocols for permitting access to the protected resources;
receiving, at the universal security configuration interface, a resource selection from an associated user for access to a protected resource on a specified cloud service;
displaying, in response to the resource selection, a plurality of interfaces prompting the associated user to provide custom credential information for satisfying a plurality of security properties of a security protocol of the specified cloud service comprising custom values, syntaxes, and/or grammars for a set of security properties for an authorization flow particular to the specified cloud service for permitting the access to the protected resource using an access token in a step of a plurality of ordered steps of the authorization flow particular to the specified cloud service;
receiving the custom credential information for satisfying the plurality of security properties of the security protocol of the specified cloud service to permit the access to the protected resource using the access token in the step of the plurality of ordered steps of the authorization flow of the security protocol particular to the specified cloud service;

storing the received custom credential information in the memory device; and sending the custom credential information to a plurality of software components in the cloud-based integration platform, wherein the plurality of software components operate to:

receive a request from an application associated with the connection for access to a selected protected resource on the specified cloud service;

retrieve the custom credential information from the universal security configuration interface;

use the custom credential information to obtain the access token from the cloud service, for use by the application associated with the connection to access the selected protected resource in accordance with the authorization flow particular to the specified cloud service; and provide the token and the custom credential information to the application for access by the application to the selected protected resource using the access token in the step of the authorization flow of the security protocol particular to the specified cloud service.

11. The method of claim 10, wherein the providing the universal security configuration interface in the web interface on the cloud-based integration platform comprises providing an integration cloud service.

12. The method of claim 10, wherein the providing the universal security configuration interface in the web interface on the cloud-based integration platform comprises providing the universal security configuration interface in the web interface on the cloud-based integration platform that comprises a security protocol comprising OAuth 2.0.

13. The method of claim 10, wherein the providing the universal security configuration interface comprises providing a universal security configuration interface comprising a dropdown list comprising a plurality of security policies, each security policy corresponding to a step in the authorization flow defined by the security protocol.

14. The method of claim 13, further comprising displaying the plurality of interfaces for a user of the cloud-based integration platform to provide the custom credential information for a plurality of security properties responsive to a selection of a particular security policy from the dropdown list.

15. The method of claim 10, further comprising:
providing the custom credential information on an authorization server associated with the cloud service; and
operating the plurality of software components to use the custom credential information to obtain an access token passed as an authorization header of a query for the protected resource or used as a parameter of the query for the protected resource.

16. The method of claim 10, wherein the sending the custom credential information to the plurality of software components comprises:
sending the custom credential information to an authorization context that comprises the custom credential information; and
sending the custom credential information to a security provider that comprises information and methods for performing each step of the authorization flow in obtaining the access token.

17. The method of claim 16, wherein the receiving the custom credential information for satisfying the plurality of security properties of the security protocol of the specified cloud service to permit the access to the protected resource using the access token in the step of the plurality of ordered steps of the authorization flow comprising a two-legged or three-legged authorization flow defined by OAuth 2.0.

18. The method of claim 10, further comprising sending the custom credential information to the plurality of software components as a JavaScript Object Notation (JSON) body in an HTTP request.

19. A non-transitory computer-readable storage medium storing a set of instructions for configuring connections in a cloud-based integration platform, said instructions, when executed by one or more processors, causing the one or more processors to perform steps comprising:

displaying a universal security configuration interface in a web interface on a cloud-based integration platform, wherein the cloud-based integration platform executes on a microprocessor and a memory device, and includes a web interface for configuring connections used to access protected resources on cloud services that implement security protocols for permitting access to the protected resources;

receiving, at the universal security configuration interface, a resource selection from an associated user for access to a protected resource on a specified cloud service;

displaying, in response to the resource selection, a plurality of interfaces prompting the associated user to provide custom credential information for satisfying a plurality of security properties of a security protocol of the specified cloud service comprising custom values, syntaxes, and/or grammars for a set of security properties for an authorization flow particular to the specified cloud service for permitting the access to the protected resource using an access token in a step of a plurality of ordered steps in the authorization flow particular to the specified cloud service;

receiving the custom credential information for satisfying the plurality of security properties of the security protocol of the specified cloud service to permit the access to the protected resource using the access token in the step of the plurality of ordered steps of the authorization flow particular to the specified cloud service;

storing the received custom credential information in the memory device; and sending the custom credential information to a plurality of software components in the cloud-based integration platform, wherein the plurality of software components operate to:

receive a request from an application associated with the connection for access to a selected protected resource on the specified cloud service;

retrieve the custom credential information from the universal security configuration interface;

use the custom credential information to obtain the access token from the cloud service, for use by the application associated with the connection to access the selected protected resource in accordance with the authorization flow particular to the specified cloud service; and provide the token and the custom credential information to the application for access by the application to the selected protected resource using the access token in the step of the plurality of ordered steps of the authorization flow of the security protocol particular to the specified cloud service.

20. The non-transitory computer-readable storage medium of claim 19, wherein:
the providing the universal security configuration interface in the web interface on the cloud-based integration platform comprises providing the universal security configuration interface in the web interface on the cloud-based integration platform that comprises a security protocol comprising OAuth 2.0, and
the providing the universal security configuration interface in the web interface on the cloud-based integration platform comprises providing an integration cloud service.

* * * * *

UNITED STATES PATENT AND TRADEMARK OFFICE
CERTIFICATE OF CORRECTION

PATENT NO. : 10,432,631 B2
APPLICATION NO. : 15/341599
DATED : October 1, 2019
INVENTOR(S) : Kaushal et al.

Page 1 of 1

It is certified that error appears in the above-identified patent and that said Letters Patent is hereby corrected as shown below:

On the Title Page

Column 1, Line 1, below Item (22) "Nov. 2, 2016" insert -- Foreign Application Priority Data Mar. 11, 2016 (IN) 201641008552 --, therefor.

In the Specification

In Column 1, Line 8, delete "subjected" and insert -- subject --, therefor.

Signed and Sealed this
Eighth Day of September, 2020

Andrei Iancu
*Director of the United States Patent and Trademark Office*